United States Patent
Cai et al.

(10) Patent No.: US 8,923,899 B2
(45) Date of Patent: Dec. 30, 2014

(54) INTERFACE BETWEEN RESTFUL WEB SERVICES AND PACKET-SWITCHED NETWORKS FOR TEXT MESSAGING

(75) Inventors: Yigang Cai, Naperville, IL (US); Gyan Shanker, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 189 days.

(21) Appl. No.: 13/160,658

(22) Filed: Jun. 15, 2011

(65) Prior Publication Data

US 2012/0322468 A1 Dec. 20, 2012

(51) Int. Cl.
*H04W 4/00* (2009.01)
*H04L 29/08* (2006.01)
*H04W 4/14* (2009.01)

(52) U.S. Cl.
CPC ............... *H04W 4/14* (2013.01); *H04L 67/20* (2013.01); *H04L 67/02* (2013.01)
USPC ........ 455/466; 455/432.2; 455/445; 719/328; 370/328; 370/466; 370/467

(58) Field of Classification Search
CPC ............... H04L 67/02; H04L 65/1016; H04L 29/06176; H04W 4/14; H04W 8/18; H04W 4/18; H04M 1/72522
USPC ............ 455/414.1, 466, 432.2, 455; 370/466, 370/467, 328–338
See application file for complete search history.

(56) References Cited

U.S. PATENT DOCUMENTS

| | | | | |
|---|---|---|---|---|
| 6,094,578 A | * | 7/2000 | Purcell et al. | 455/426.1 |
| 2002/0056001 A1 | * | 5/2002 | Magee et al. | 709/225 |
| 2005/0036498 A1 | * | 2/2005 | Clarke et al. | 370/395.52 |
| 2008/0219757 A1 | * | 9/2008 | Rutledge et al. | 403/268 |
| 2010/0094926 A1 | * | 4/2010 | Shukla et al. | 709/203 |
| 2011/0161465 A1 | * | 6/2011 | Kowalski | 709/219 |
| 2012/0023175 A1 | * | 1/2012 | DeLuca | 709/206 |

FOREIGN PATENT DOCUMENTS

| IE | WO 2009/133544 | * | 5/2009 |
|---|---|---|---|
| WO | WO2009/133544 A1 | | 11/2009 |

OTHER PUBLICATIONS

Roy Thomas Fielding, "Dissertation: Architectural Styles and the Design of Network-based Software Architectures" © Roy Thomas Fielding, 2000. All rights reserved.

"3rd Generation Partnership Project; Technical Specification Group Core Network and Terminals; Support of SMS over IP networks; Stage 3 (Release 8)" 3GPP TS 24.341 V8.0.0 (Dec. 2008).

(Continued)

*Primary Examiner* — Quan M Hua
(74) *Attorney, Agent, or Firm* — Duft Bornsen & Fettig, LLP

(57) ABSTRACT

Systems and methods are disclosed for interfacing RESTful web applications with packet-switched networks for text messaging. One embodiment comprises a system that handles a Mobile Terminated (MT) text message from a web application to a packet-switched network. The system receives a RESTful send operation for sending the MT text message from the web application. The system converts the RESTful send operation for the MT text message to a send request that is based on a signaling protocol used by the packet switched network, such as SIP, SMPP, or MAP. The system then transmits the send request for the MT text message to the packet-switched network for delivery of the MT text message to a recipient.

16 Claims, 7 Drawing Sheets

(56) References Cited

OTHER PUBLICATIONS

Soonchul Jung et al., Call/Messaging Open API for Telecommunication Technology, 2008, ICACT 2008. 10th International Conference on, IEEE, Piscataway, NJ, USA, Feb. 17, 2008, pp. 1139-1143, XP031245319, ISBN 978-89-5591-136-3.

Darvishan A H et al., "OSA ParlyX Gateway architecture for 3rdParty Operators Participation Next Networks", Advance Communication Technology (IACT), 2010 The 12th International Conference on IEEE, Piscataway, NJ, USA, Feb. 7, 2010, pp. 75-80, XP031653978, ISBN 978-1-4244-5427-3.

"RESTful Bindings for Parlay X Web Services-Short Messaging; Candidate Version 1.1", Jan. 11, 2011 pp. 1-87, XP55040520, Retrieved from Internet: URL:http//www.openmobilealliance.org/Technical/release_program/docs/ParlayREST/V2_0-20110111-C/OMA-TS-ParlayREST_shortmessaging-V1_1-20110111-C.pdf [retrieved on Oct. 10, 2012].

\* cited by examiner

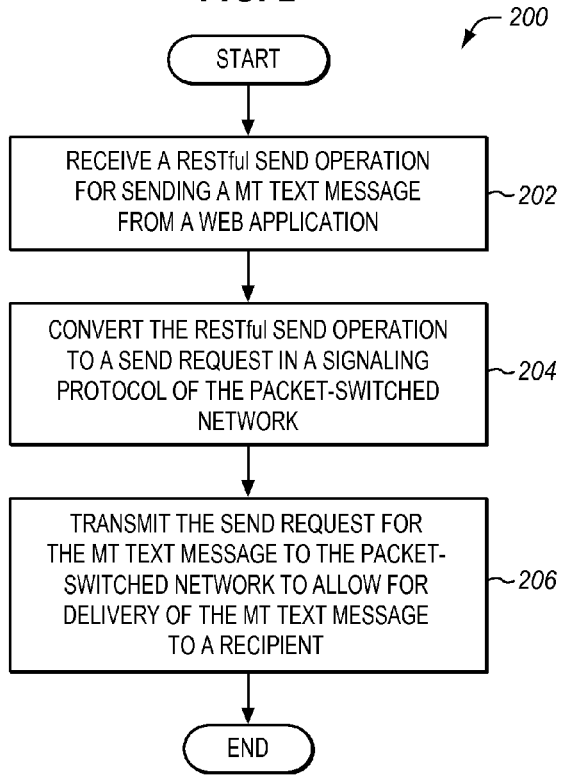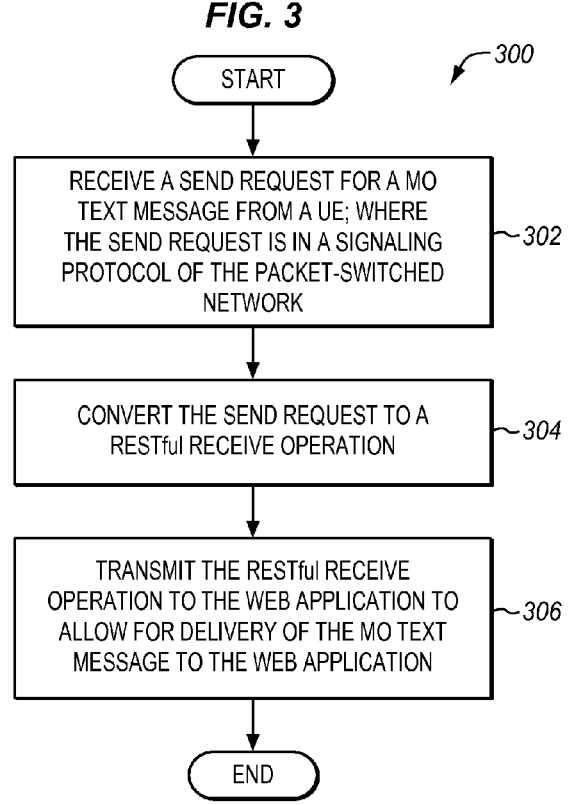

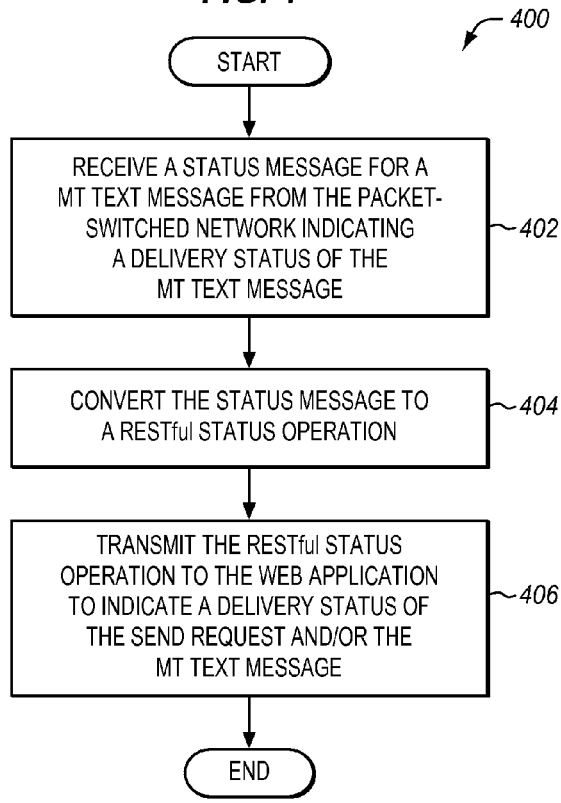
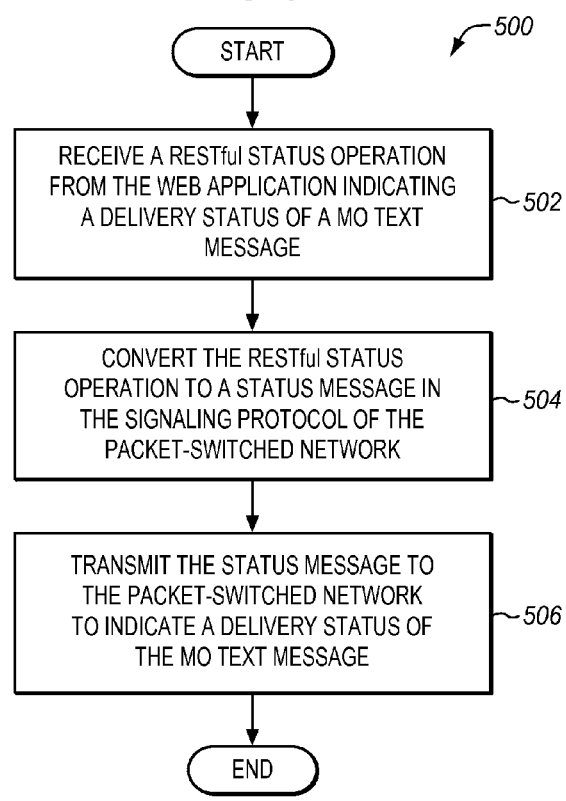

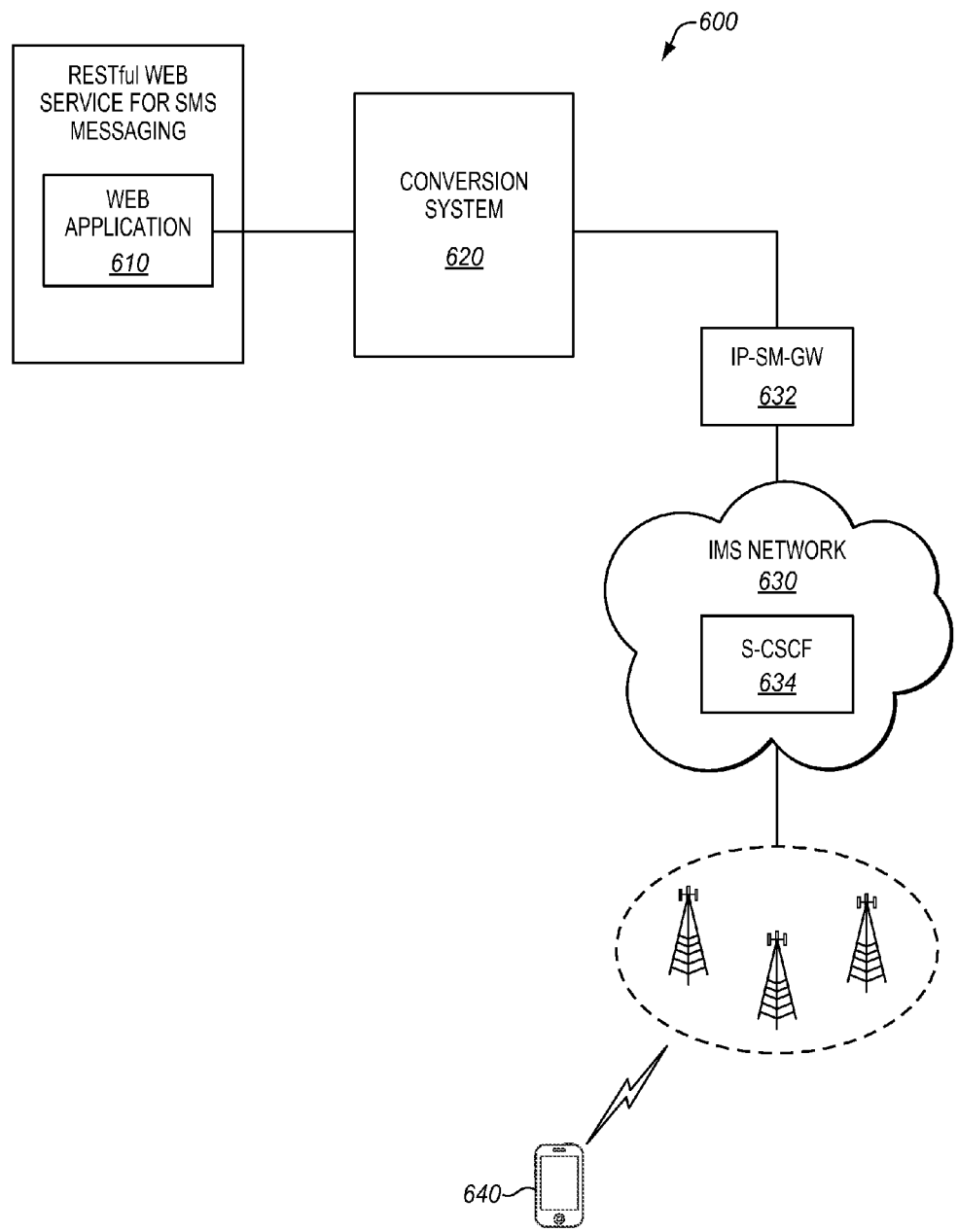

INTERFACE BETWEEN RESTFUL WEB SERVICES AND PACKET-SWITCHED NETWORKS FOR TEXT MESSAGING

FIELD OF THE INVENTION

The invention is related to the field of communications and, in particular, to interfacing RESTful web services with packet-switched networks for text messaging.

BACKGROUND

Text messaging has become a popular mode of communication in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

Although text messaging is traditionally thought of as two mobile devices exchanging text messages, there may be web-based applications that allow an end user to send or receive text messages. For example, an end user may access a $3^{rd}$ party web site for sending/receiving text messages. Through the $3^{rd}$ party web site, the end user may enter a message intended for a recipient and a telephone number for the recipient. The web-based application then generates a send request for the text message using an Application Programming Interface (API) defined for web-based services. In another example, some social networking services (e.g., Facebook) may provide text messaging capabilities through a web site. When a user logs into his/her social network account, one option available to the end user may be to send/receive text messages.

Organizations have defined standard APIs for web-based applications to use when sending/receiving text messages. One API that is used for web applications is a RESTful API, also referred to as a RESTful web API. The RESTful web API is a set of operations that use HTTP methods, such as POST, GET, PUT, and DELETE, while conforming to Representational State Transfer (REST) constraints.

Unfortunately, the RESTful APIs presently used for web services do not provide enough flexibility for today's evolving networks.

SUMMARY

Embodiments described herein provide a system, such as an API, that interfaces RESTful web services with packet-switched networks. The system is able to translate RESTful operations from a web application to messages in the signaling protocol of the packet-switched network for SMS/MMS messaging. Also, the system is able to translate signaling messages from the packet-switched network to RESTful operations. By converting between RESTful and the signaling protocol of the packet-switched network, text messages may be exchanged directly between the web application and the packet-switched network. This advantageously improves how web-based text messaging may be implemented in evolving networks, such as IMS networks or LTE networks.

One embodiment comprises a system that handles a Mobile Terminated (MT) text message from a web application to a packet-switched network. The system includes an interface operable to receive a RESTful send operation from the web application that is used for sending the MT text message from the web application. The system further includes a controller operable to convert the RESTful send operation for the MT text message to a send request in a signaling protocol used in the packet-switched network. The signaling protocol used in the packet-switched network may be Session Initiation Protocol (SIP), Short Message Peer-to-Peer (SMPP) protocol, Mobile Application Part (MAP) protocol, etc. The interface is further operable to transmit the send request for the MT text message to the packet-switched network for delivery of the MT text message to a recipient.

In another embodiment, the system is able to handle a Mobile Originated (MO) text message from the packet-switched network to the web application. The interface is operable to receive a send request for the MO text message from the packet-switched network. As above, the send request is in the signaling protocol used in the packet-switched network. The controller is further operable to convert the send request for the MO text message to a RESTful receive operation that is used for receiving the MO text message into the web application. The interface is further operable to transmit the RESTful receive operation for the MO text message to the web application for delivery of the MO text message to a user of the web application.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 2 is a flow chart illustrating a method of handling a MT text message from a web application to user equipment (UE) in an exemplary embodiment.

FIG. 3 is a flow chart illustrating a method of handling a MO text message from a UE to a web application in an exemplary embodiment.

FIG. 4 is a flow chart illustrating a method of handling a status message from a packet-switched network to a web application in an exemplary embodiment.

FIG. 5 is a flow chart illustrating a method of handling a RESTful status operation from a web application to a packet-switched network in an exemplary embodiment.

FIG. 6 illustrates a communication system in another exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
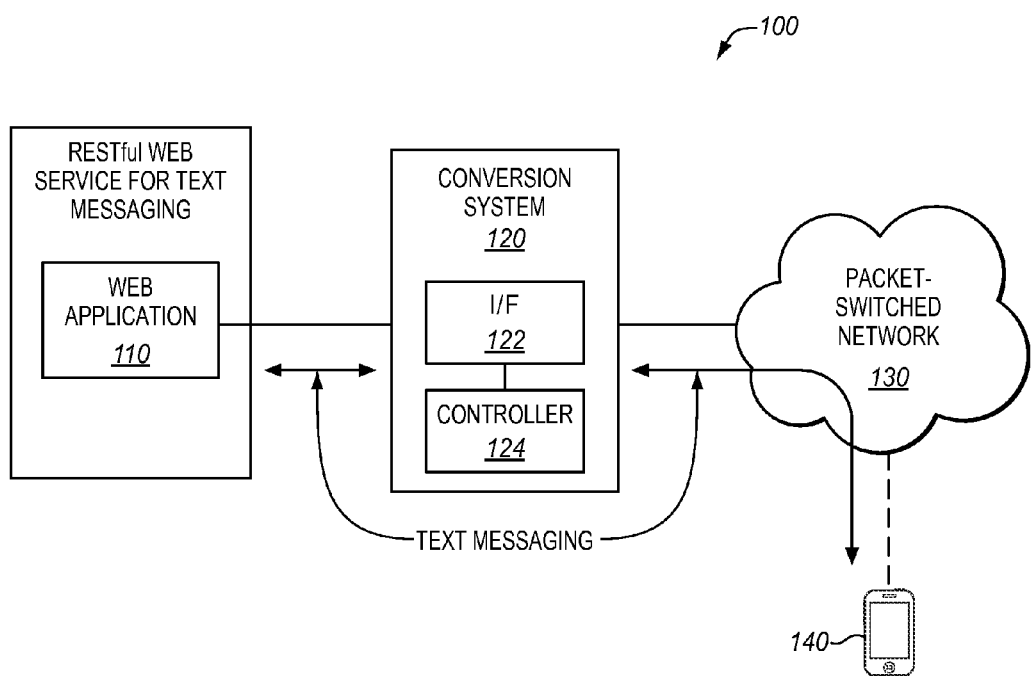
FIG. 1 illustrates a communication system in an exemplary embodiment.

FIG. 1 illustrates a communication system 100 in an exemplary embodiment. Communication system 100 includes a web application 110 coupled to a packet-switched network 130 through a conversion system 120. Web application 110 is part of a web-based service for sending and receiving text messages, such as SMS messages or MMS messages. In this embodiment, web application 110 uses RESTful for sending and receiving text messages. Packet-switched network 130 comprises any network that exchanges communications using packets, such as IP packets. Packet-switched network 130 may comprise an IMS network, an LTE network, or any other IP-based network. Packet-switched network 130 may include a variety of network nodes (not shown) in order to provide voice and/or data services to User Equipment (UE) 140. More particularly, a network node of packet-switched network 130 provides a text messaging service to UE 140.

Web application 110 is able to exchange text messages with UE 140 with the assistance of conversion system 120. Conversion system 120 acts to translate RESTful operations to a signaling protocol used in packet-switched network 130, and vice-versa. Conversion system 120 may be thought of as an Application Programming Interface (API), as it converts standardized operations from web application 110 to the signaling protocol used in packet-switched network 130. In this embodiment, the signaling protocol used in packet-switched network 130 may be Session Initiation Protocol (SIP), Short Message Peer-to-Peer (SMPP) protocol, Mobile Application Part (MAP) protocol, or another protocol.

Conversion system 120 includes an interface 122 and a controller 124. Interface 122 comprises any device or component that communicates with web application 110 and/or other web applications not shown using RESTful. Interface 122 is also able to communicate with packet-switched network 130 through a signaling protocol used within packet-switched network 130. Controller 124 comprises any device or component that translates messages between RESTful and the signaling protocol used in packet-switched network 130.

Assume that a user of web application 110 creates a text message intended for UE 140. This is referred to as a Mobile Terminated (MT) or Application Originated (AO) text message. When this occurs, web application 110 generates a RESTful operation or command for sending the MT text message. For example, a RESTful operation for sending the MT text message may comprise a POST operation with a "SendSms" command inserted for the MT text message. The operation for sending the MT text message is referred to herein generally as a RESTful send operation. Web application 110 then transmits the RESTful send operation to conversion system 120.

FIG. 2 is a flow chart illustrating a method 200 of handling the MT text message from web application 110 to UE 140 in an exemplary embodiment. The steps of method 200 will be described with reference to conversion system 120 in FIG. 1, but those skilled in the art will appreciate that methods described herein may be performed in other systems. The steps of the flow charts described herein are not all inclusive and may include other steps not shown. The steps may also be performed in an alternative order.

In step 202, interface 122 receives the RESTful send operation for the MT text message from web application 110. In step 204, controller 124 converts the RESTful send operation to a send request in the signaling protocol used in packet-switched network 130. For example, if the signaling protocol used in packet-switched network 130 comprises SIP, then controller 124 may convert the RESTful send operation to a SIP MESSAGE that encapsulates the MT text message. In order to perform the conversion, controller 124 may store a table that maps the RESTful operations to methods of the signaling protocol used in packet-switched network 130. The table may also map fields from the RESTful operations (e.g., source address, terminating address, message type, etc) to fields in the signaling protocol. Controller 124 may use this table to convert the RESTful send operation from web application 110 to the send request.

In step 206, interface 122 transmits the send request to packet-switched network 130 so that the MT text message may be delivered to its intended recipient, which is UE 140. The appropriate node in packet-switched network 130 may attempt delivery of the MT text message to UE 140 without conversion to another protocol.

A similar process as described above is used for delivering a text message from UE 140 to web application 110. Assume that an end user of UE 140 creates a text message intended for web application 110. This is referred to as a Mobile Originated (MO) or Application Terminated (AT) text message. When this occurs, a text message application in UE 140 generates a send request in the signaling protocol for packet-switched network 130 that is used for sending the MO text message, such as a SIP MESSAGE. UE 140 then transmits the send request to conversion system 120.

FIG. 3 is a flow chart illustrating a method 300 of handling the MO text message from UE 140 to web application 110 in an exemplary embodiment. In step 302, interface 122 receives the send request for the MO text message from UE 140. In step 304, controller 124 converts the send request to a RESTful receive operation. The RESTful receive operation is an operation that is used by web application 110 for receiving the MO text message. For example, controller 124 may convert the send request into a POST operation with a "NotifySmsReception" command inserted for the MO text message. The operation for receiving the MO text message in web application 110 is referred to herein generally as a RESTful receive operation. In step 306, interface 122 transmits the RESTful receive operation to web application 110 so that the MO text message may be delivered to web application 110. Web application 110 may then process the RESTful receive operation to extract the MO text message, and display the text message to a user.

When MT and MO text messages are sent as described in the above embodiments (see step 206 of FIG. 2), there may be additional messages exchanged to indicate whether the text messages are successfully delivered. These messages may be referred to as notifications, acknowledgements, status messages, etc. Conversion system 120 is able to translate these additional messages in a similar manner as described above. FIGS. 4-5 illustrate conversion of messages that carry status information for text message delivery. There may be additional messages sent to exchange the status information between web application 110 and packet-switched network 130 than those described in FIGS. 4-5. More detailed message diagrams are provided in FIGS. 7-9.

When packet-switched network 130 receives a send request for a MT text message, packet-switched network 130 attempts to deliver the MT text message to UE 140. If delivery of the MT text message is successful or fails, packet-switched network 130 generates a status message that includes status information for the delivery of the MT text message. The status message is in the signaling protocol used by packet-switched network 130. For example, if SIP is used in packet-switched network 130, then the status message may comprise a SIP MESSAGE, a SIP NOTIFY, or a SIP response such as a SIP 7xx message. Packet-switched network 130 then transmits the status message to conversion system 120.

FIG. 4 is a flow chart illustrating a method 400 of handling a status message from packet-switched network 130 to web application 110 in an exemplary embodiment. In step 402, interface 122 receives the status message for the MT text message from packet-switched network 130. In step 404, controller 124 converts the status message to a RESTful status operation. For example, a RESTful status operation may comprise a POST operation with a "NotifySmsReception" command inserted that encapsulates the status information. In step 406, interface 122 transmits the RESTful status operation to web application 110. Web application 110 may then extract the status information from the RESTful status operation, and process the status information as desired.

For a MO text message, web application 110 is able to generate status information for delivery of the MO text message. If delivery of the MO text message is successful or fails, web application 110 generates a RESTful status operation that includes the status information for the MO text message. The RESTful status operation may comprise a POST operation with a "NotifySmsDeliveryReceipt" command inserted that encapsulates the status information. Web application 110 then transmits the RESTful status operation to conversion system 120.

FIG. 5 is a flow chart illustrating a method 500 of handling a RESTful status operation from web application 110 to packet-switched network 130 in an exemplary embodiment. In step 502, interface 122 receives the RESTful status operation for the MO text message from web application 110. In step 504, controller 124 converts the RESTful status operation to a status message in the signaling protocol of packet-switched network 130. For example, if SIP is used in packet-switched network 130, then the status message may comprise a SIP MESSAGE that encapsulates the status information. In step 506, interface 122 transmits the status message to packet-switched network 130. Packet-switched network 130 may then extract the status information from the status message, and process the status information as desired.

Conversion system 120 as described above allows for web-based text messaging to be implemented in evolving packet-switched networks. For example, conversion system 120 may be used to implement web-based text messaging in IMS networks and LTE networks. This can advantageously increase revenues for IMS and LTE service providers.

EXAMPLES

FIG. 6 illustrates a communication system 600 in another exemplary embodiment. Communication system 600 includes a web application 610 coupled to an IMS network 630 through a conversion system 620 and an IP Short Message Gateway (IP-SM-GW) 632. IMS network 630 includes a Serving-Call Session Control Function (S-CSCF) 634 that serves a UE 640. Web application 610 uses RESTful for sending/receiving text messages. Therefore, conversion system 620 is able to convert RESTful operations to the signaling protocol of IMS network 630, and vice-versa. Conversion system 620 may be thought of as a new API that provides a RESTful SMS Web Service. RESTful SMS Web Service provides operations for a web application to send a MT SMS message to a packet-switched (IP) network, to receive a MO SMS message from the packet-switched network, to send/receive acknowledgement message to/from the packet-switched network for MT/MO messages, and to asynchronously receive notification of message delivery status.

RESTful SMS Web Service supports the following SMS interfaces/methods toward web application 610.
 SendSms
 GetSmsDeliveryStatus
 GetReceivedSms
 StartSmsNotification
 StopSmsNotification
 NotifySmsReception
 NotifySmsDeliveryReceipt Each RESTful interface/method belongs to an HTTP verb/operation. Table 1 shows the relationship of RESTful profiles with 3GPP MAP and SMPP PDU.

TABLE 1

| SMS Interface | Method | HTTP Verbs | MAP SMS | SMPP PDU |
| --- | --- | --- | --- | --- |
| SendSms | SendSms | POST | mt-ForwardSM/SMS-DELIVER | submit_sm<br>submit_sm_resp |
|  | GetSmsDeliveryStatus | GET | None |  |
| SmsNotification | NotifySmsReception | POST | mo-ForwardSM/SMS-SUBMIT<br>mo-ForwardSM-res/SMS-SUBMIT for ACK or ERROR<br>mt-ForwardSM-res/SMS-DELIVER for ACK or ERROR | deliver_sm<br>deliver_sm_resp |
|  | NotifySmsDeliveryReceipt | POST | Report-SM-Delivery-Status/SMS-STATUS-REPORT | deliver_sm<br>deliver_sm_resp |
| ReceiveSms | GetReceivedSms | GET | Its 200 OK response maps to mo-ForwardSM/SMS-SUBMIT | Its 200 OK response maps to deliver_sm |
| SmsNotification Manager | StartSmsNotification<br>StopSmsNotification | POST<br>DELETE | None<br>None |  |

The RESTful SMS Web Service should support HTTP status codes for return of each of the HTTP verbs. These status codes include but not limited to:
 200 OK
 202 Accepted
 400 Bad Request
 403 Forbidden
 500 Internal Server Error The examples shown in FIGS. 7-9 further illustrate how conversion system 620 interfaces web application 610 with IMS network 630 when IMS network 630 uses SIP as a signaling protocol.

Figure 7:
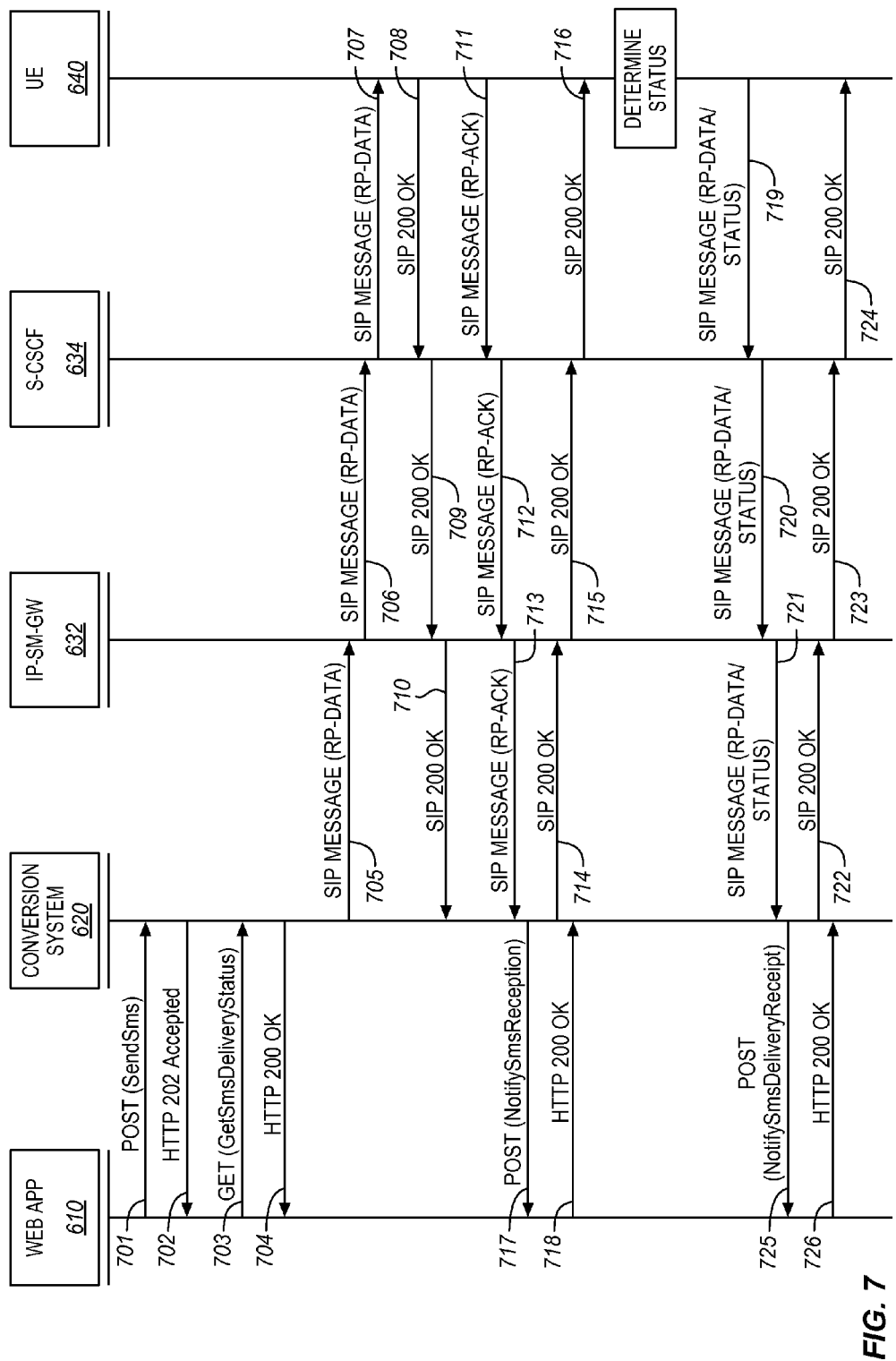
FIG. 7 is a message diagram illustrating a call flow for a MT SMS message in an exemplary embodiment.

FIG. 7 is a message diagram illustrating a call flow for a MT SMS message in an exemplary embodiment. Assume for one example that a user of web application 610 creates a MT SMS message intended for UE 640. When this occurs, web application 610 generates a RESTful send operation for sending the MT SMS message. In this example, the RESTful send operation comprises a POST operation with a "SendSms" command inserted in the POST operation. One example of the POST operation is as follows:

```
POST /openapi/sms/rest/v1.0/sendsms HTTP/1.1
Authorization: Basic XMVDTdx+
X-Partner-Id: ACP123@acp.alcatel-lucent.com
X-Service-Id: APP123@ACP123
Host: acp.alcatle-lucent.com
Content-Type: application/json
Content-Length: (...)
{"SendSMS":[{"sendAddress":"sip:+16302241234@acp.alcatel-lucent.com","address":"tel:+16303556789","message body":"Hello, Alice","DateTime":"2010-25T15:30:00"}]}
```

The POST operation includes the SendSms command for sending the SMS message. The originator's address is +1 630 224 1234, the recipient's address is +1 630 355 6789, and the SMS text body is "Hello, Alice". Web application 610 transmits the POST operation to conversion system 620 (see arrow 701). Conversion system 620 responds to web application 610 with an HTTP 202 Accepted message (see arrow 702).

Web application 610 also sends a request to conversion system 620 for a delivery status report. The status request comprises a GET (GetSmsDeliveryStatus) operation (see arrow 703). One example of the GET operation is as follows:

```
GET /openapi/sms/rest/v1.0/registration/7777/messages HTTP/1.1
Authorization: Basic XMVDTdx+
X-Partner-Id: ACP123@acp.alcatel-lucent.com
X-Service-Id: APP123@ACP123
Host: acp.alcatel-lucent.com
Accept application/json
Content-Length: 0
```

Conversion system 620 responds back to web application 610 with an HTTP 200 OK message that includes delivery information (see arrow 704). One example of the HTTP 200 OK is as follows:

```
HTTP/1.1 200 OK
Content-Type: application/json
Content-Length: (...)
{"DeliveryInformation":[{"address":"tel:+16303556789","deliveryStatus": "DeliveredToNetwork"}]}
```

Conversion system 620 extracts address data and the SMS body from the POST (SendSMS) operation, and converts it into a SIP MESSAGE that encapsulates the SMS message. More particularly, the MT SMS message is embedded in the 3GPP MAP RP-DATA (MAP mt-ForwardSM (SMS-DELIVER)) of the SIP MESSAGE. Where MAP RP-DATA is used within the SIP MESSAGE to encapsulate the MT SMS message, the RP-DATA may have the parameters indicated in Table 2.

TABLE 2

| Information element | Presence | Usage |
| --- | --- | --- |
| RP-Message Type | M | Set to 001 for RP-DATA |
| RP-Message Reference | M | This will be part of message identity of HTTP |
| RP-Originator Address | M | Source address |
| RP-Destination Address | M | Destination address |
| RP-User Data | M | SMS data |

When the RP-User Data field includes an SMS-DELIVER TPDU for MT SMS messages (see 3GPP TS 23.040), the RP-User Data may have the parameters illustrated in Table 3.

TABLE 3

| Abbr. | Reference | P | Description |
| --- | --- | --- | --- |
| TP-MTI | TP-Message-Type-Indicator | M | Parameter describing the message type |
| TP-MMS | TP-More-Messages-to-Send | M | Parameter indicating whether or not there are more messages to send |
| TP-LP | TP-Loop-Prevention | M | Parameter indicating that SMS applications should inhibit forwarding or automatic message generation that could cause infinite looping. Should be set to 0 |
| TP-RP | TP-Reply-Path | M | Parameter indicating that Reply Path exists |
| TP-UDHI | TP-User-Data-Header-Indicator | O | Parameter indicating that the TP-UD field contains a Header |
| TP-SRI | TP-Status-Report-Indication | O | Parameter indicating if the SME has requested a status report. Could optionally be set to 1 if GET (GetSmsDeliveryStatus) received |
| TP-OA | TP-Originating-Address | M | Address of the originating SME |
| TP-PID | TP-Protocol-Identifier | M | Parameter identifying the above layer protocol, if any |
| TP-DCS | TP-Data-Coding-Scheme | M | Parameter identifying the coding scheme within the TP-User-Data |
| TP-SCTS | TP-Service-Centre-Time-Stamp | M | Parameter identifying time when the SC received the message |
| TP-UDL | TP-User-Data-Length | M | Parameter indicating the length of the TP-User-Data field to follow |
| TP-UD | TP-User-Data | O | SMS body |

After converting the POST operation to a SIP MESSAGE, conversion system 620 transmits the SIP MESSAGE to IP-SM-GW 632 (see arrow 705). IP-SM-GW 632 in turn forwards the SIP MESSAGE to S-CSCF 634 of IMS network 630 (see arrow 706). Because the SMS message is already encapsulated within a SIP MESSAGE, IP-SM-GW 632 does not have to convert the message from another protocol (e.g., SMPP) to SIP. S-CSCF 634 then delivers the SIP MESSAGE to UE 640 (see arrow 707). UE 640 parses the SIP MESSAGE successfully, and responds to conversion system 620 with a SIP 200 OK (see arrows 708-710).

UE 640 then parses the RP-DATA of the SIP MESSAGE and determines that the RP-DATA includes an embedded delivery status request in TP-SRI (see Table 3). Therefore, UE 640 sends another SIP MESSAGE to conversion system 620 (see arrows 711-713) that includes the status information for the original SIP MESSAGE that carried the SMS message. More particularly, the status information is embedded in the RP-ACK of the SIP MESSAGE. The RP-ACK may have the parameters indicated in Table 4.

TABLE 4

| Information element | Presence | Usage |
|---|---|---|
| RP-Message Type | M | Set to 010 for RP-ACK |
| RP-Message Reference | M | this one will be part of message identity of HTTP message |
| RP-User Data | M | SMS data |

Conversion system 620 replies back to UE 640 with a SIP 200 OK (see arrows 714-716).

In response to the SIP MESSAGE that includes the status information for the SIP MESSAGE, conversion system 620 converts the SIP MESSAGE from UE 640 into a RESTful status operation that encapsulates the status information. The RESTful status operation in this example is a POST operation (NotifySmsReception). Conversion system 620 maps parameters from the MAP RP-ACK into the POST operation. One example of the POST operation is as follows:

POST /openapi/sms/rest/v1.0/receivedsmsnotification HTTP/1.1
X-Partner-Id: ACP123@acp.alcatel-lucent.com
X-Service-Id: APP123@ACP123
Host: acp.alcatle-lucent.com
Content-Type: application/json
Content-Length: (...)
{"senderAddress": "tel: +16302241234", "smsServiceActivationNumber": "7777","message":"Hello, Alice", "dateTime":"2010-12-25T16:30:15"}

Conversion system 620 then transmits the POST (NotifySmsReception) operation to web application 610 (see arrow 717). Web application 610 replies to conversion system 620 with an HTTP 200 OK (see arrow 718).

In addition to providing status information for the SIP MESSAGE, UE 640 is able to determine whether the SMS message itself was successfully delivered. Even though a SIP MESSAGE that encapsulates the SMS message was successfully received in UE 640, the SMS message itself may be corrupted in some manner so that it cannot be processed and displayed to an end user. Therefore, UE 640 is able to determine whether the SMS message was processed and provided to the end user, and generate status information for delivery of the MT SMS message.

UE 640 sends another SIP MESSAGE to conversion system 620 that includes the status information for the MT SMS message (see arrows 719-721). The status information (delivery status report) is embedded in the RP-DATA of the SIP MESSAGE (MAP Report-SM-Delivery-Status (SMS-STATUS-REPORT)). The SIP MESSAGE format is the same as the original SIP MESSAGE for the SMS message, but the TPDU in the RP-DATA includes the SMS-STATUS-REPORT as defined by TS 23.040. The RP-User Data may have the parameters illustrated in Table 5.

TABLE 5

| Abbr. | Reference | P | Description |
|---|---|---|---|
| TP-MTI | TP-Message-Type-Indicator | M | Parameter describing the message type |
| TP-UDHI | TP-User-Data-Header-Indication | O | Parameter indicating that the TP-UE field contains a Header |

TABLE 5-continued

| Abbr. | Reference | P | Description |
|---|---|---|---|
| TP-MMS | TP-More-Messages-to-Send | M | Parameter indicating whether or not there are more messages to send |
| TP-LP | TP-Loop-Prevention | O | Parameter indicating that SMS applications should inhibit forwarding or automatic message generation that could cause infinite looping. |
| TP-SRQ | TP-Status-Report-Qualifier | M | Parameter indicating whether the previously submitted TPDU was an SMS-SUBMIT or an SMS-COMMAND |
| TP-MR | TP-Message-Reference | M | Parameter identifying the previously submitted SMS-SUBMIT or SMS-COMMAND |
| TP-RA | TP-Recipient-Address | M | Address of the recipient of the previously submitted mobile originated short message |
| TP-SCTS | TP-Service-Centre-Time-Stamp | M | Parameter identifying time when the SC received the previously sent SMS-SUBMIT |
| TP-DT | TP-Discharge-Time | M | Parameter identifying the time associated with a particular TP-ST outcome |
| TP-ST | TP-Status | M | Parameter identifying the status of the previously sent mobile originated short message. This will be mapped to HTTP delivery information and delivery status parameters |
| TP-PI | TP-Parameter-Indicator | O | Parameter indicating the presence of any of the optional parameters which follow |
| TP-PID | TP-Protocol-Identifier | O | see clause 9.2.3.9. TP-PID of original SMS-SUBMIT |
| TP-DCS | TP-Data-Coding-Scheme | O | see clause 9.2.3.10 |
| TP-UDL | TP-User-Data-Length | O | see clause 9.2.3.16 |
| TP-UD | TP-User-Data | O | see clause 9.2.3.24 |

Conversion system 620 replies back to UE 640 with a SIP 200 OK (see arrows 722-724).

In response to the SIP MESSAGE that includes the status information for the SMS message, conversion system 620 converts the SIP MESSAGE from UE 640 into a RESTful status operation that encapsulates the status information. The RESTful status operation in this example is a POST operation (NotifySmsDeliveryReceipt). One example of the POST operation is as follows:

POST /openapi/sms/rest/v1.0/deliveryreceiptnotification HTTP/1.1
X-Partner-Id: ACP123@acp.alcatel-lucent.com
X-Service-Id: APP123@ACP123
Host: acp.alcatle-lucent.com
Content-Type: application/json
Content-Length: (...)
{"requestedID":"123456789","deliveryInformation":{"address: "tel: +16303556789", "deliveryStatus":"deliveredToNetwork"}}

Conversion system 620 then transmits the POST operation to web application 610 (see arrow 725). Web application 610 replies to conversion system 620 with an HTTP 200 OK (see arrow 726). There may be additional messaging that is used to deliver the MT SMS message and its associated status information, as FIG. 7 gives an overview of the messaging used in the SMS delivery.

Figure 8:
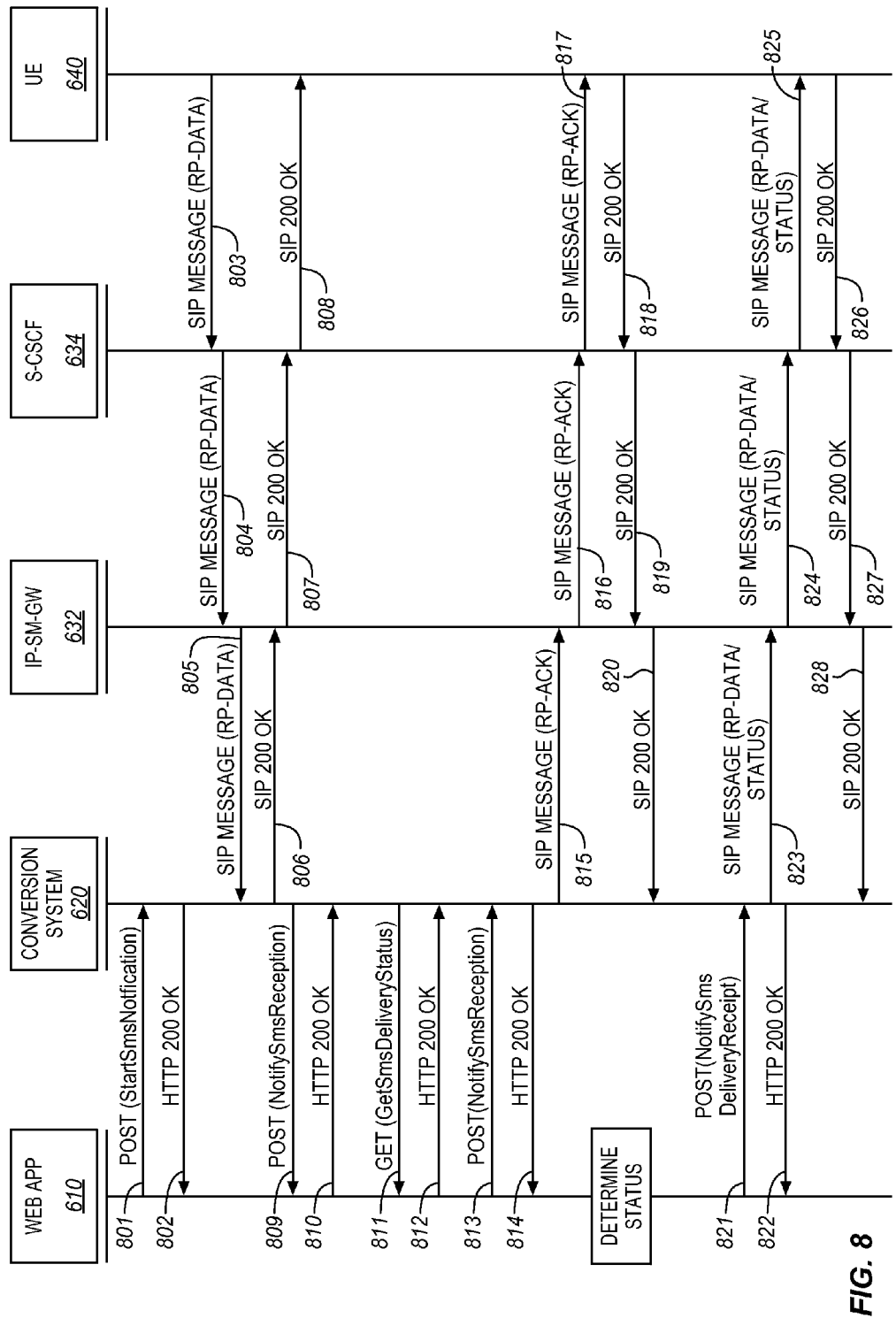
FIG. 8 is a message diagram illustrating a call flow for a MO SMS message in an exemplary embodiment.

FIG. 8 is a message diagram illustrating a call flow for a MO SMS message in an exemplary embodiment. FIG. 8 illustrates the scenario where the user of web application 610 is online when the MO SMS message is sent. Web application 610 generates a POST operation (StartSmsNotification) to set up receiving SMS messages from conversion system 620. One example of the POST operation (StartSmsNotification) is as follows:

```
POST /openapi/sms/rest/v1.0/startSmsNotification HTTP/1.1
Authorization: Basic XMVDTdx+
X-Partner-Id: ACP123@acp.alcatel-lucent.com
X-Service-Id: APP123@ACP123
Host: acp.alcatle-lucent.com
Content-Type: application/json
Content-Length: (...)
{"smsServiceActivationNumber":"tel:7777",
"reference":{"endpoint":"http://135.44. 0.88:8080/sms/
ReceiptSMSNotification","interfaceName":"smsnotification",
"correlator":"6666"},"criteria":"a"}
```

Web application 610 then sends the POST operation to conversion system 620 (see arrow 801). Conversion system 620 responds back to web application 610 with an HTTP 200 OK (see arrow 802).

Assume in this example that an end user of UE 640 creates a MO SMS message intended for web application 610. When this occurs, UE 640 generates a SIP MESSAGE that encapsulates the SMS message in an RP-DATA field (which contains MAP MO-Forward-SM (SMS-SUBMIT)). When the RP-User Data field includes an SMS-SUBMIT TPDU for MO SMS messages (see 3GPP TS 23.040), the RP-User Data may have the parameters illustrated in Table 6.

TABLE 6

| Abbr. | Reference | P | Description |
|---|---|---|---|
| TP-MTI | TP-Message-Type-Indicator | M | Parameter describing the message type; set to 01 for SMS-SUBMIT. |
| TP-RD | TP-Reject-Duplicates | M | Parameter indicating whether or not the SC shall accept an SMS-SUBMIT for an SM still held in the SC which has the same TP-MR and the same TP-DA as a previously submitted SM from the same OA |
| TP-VPF | TP-VPF | M | Parameter indicating whether or not the TP-VP field is present. |
| TP-RP | TP-Reply-Path | M | Parameter indicating that Reply Path exists. |
| TP-UDHI | TP-User-Data-Header-Indicator | O | Parameter indicating that the TP-UD field contains a Header |
| TP-SRR | TP-Status-Report-Request | O | Parameter indicating if the UE is requesting a status report. If sending entity request a deliver status/receipt. Convert to POST(NotifySmsDeliveryStatus) |
| TP-MR | TP- Message-Reference | M | Parameter identifying the SMS-SUBMIT. |
| TP- DA | TP- Destination-Address | M | Web applications address |
| TP- PID | TP- Protocol-Identifier | M | Parameter identifying the above layer protocol, if any. |
| TP- DCS | TP- Data-Coding-Scheme | M | Parameter identifying the coding scheme within the TP-User-Data. |
| TP-VP | TP-Validity-Period | O | Parameter identifying the time from where the message is no longer valid. |
| TP-UDL | TP-User-Data-Length | M | Parameter indicating the length of the TP-User-Data field to follow. |
| TP-UD | TP-User-Data | O | SMS body |

UE 640 then transmits the SIP MESSAGE to conversion system 620 through IP-SM-GW 632 and S-CSCF 634 (see arrows 803-805). Conversion system 620 responds to UE 640 with a SIP 200 OK (see arrows 806-808).

After receiving the SIP MESSAGE, conversion system 620 converts the SIP MESSAGE to a RESTful receive operation that encapsulates the SMS message. The RESTful receive operation comprises a POST operation (NotifySmsReception) that encapsulates the SMS message. The POST operation is used in web application 610 to receive an MO SMS message when the user is online. One example of the POST operation (NotifySmsReception) is as follows:

```
POST /openapi/sms/rest/v1.0/receivedsmsnotification HTTP/1.1
X-Partner-Id: ACP123@acp.alcatel-lucent.com
X-Service-Id: APP123@ACP123
Host: acp.alcatle-lucent.com
Content-Type: application/json
Content-Length: (...)
{"senderAddress":"tel: +16303556789",
"smsServiceAxtivationNumber":"7777","message":"Hello, Bob",
"dateTime":"2010-12-25T18:30:15"}
```

Conversion system 620 sends the POST operation to web application 610 (see arrow 809). Web application 610 responds back to conversion system 620 with an HTTP 200 OK (see arrow 810).

The original SIP MESSAGE from UE 640 included an embedded delivery status request in TP-SRR (see Table 6). Therefore, conversion system 620 generates a GET (GetSmsDeliveryStatus) operation requesting a delivery status report for the MO SMS message. One example of the GET operation (GetSmsDeliveryStatus) is as follows:

```
GET /openapi/sms/rest/v1.0/registration/7777/messages HTTP/1.1
Authorization: Basic XMVDTdx+
X-Partner-Id: ACP123@acp.alcatel-lucent.com
X-Service-Id: APP123@ACP123
Host: acp.alcatel-lucent.com
Accept application/json
Content-Length: 0
```

Conversion system 620 then sends the GET operation (GetSmsDeliveryStatus) to web application 610 (see arrow 811). Web application 610 responds back to conversion system 620 with an HTTP 200 OK that includes the status information (see arrow 812). One example of the HTTP 200 OK is as follows:

```
HTTP/1.1 200 OK
Content-Type: application/json
Content-Length: (...)
{"DeliveryInformation":[{"address":"tel:+16302441234","deliveryStatus": "DeliveredToNetwork"}]}
```

Web application 610 then sends a POST operation (NotifySmsReception) to conversion system 620 (see arrow 813) as an acknowledgement that the MO SMS message was received. One example of the POST operation is as follows:

```
POST /openapi/sms/rest/v1.0/receivedsmsnotification HTTP/1.1
X-Partner-Id: ACP123@acp.alcatel-lucent.com
X-Service-Id: APP123@ACP123
Host: acp.alcatle-lucent.com
Content-Type: application/json
Content-Length: (...)
{"senderAddress":"tel: +16303556789",
"smsServiceActivationNumber":"7777","message":"Hello, Bob",
"dateTime":"2010-12-25T18:30:30"}
```

Conversion system 620 responds back to web application 610 with an HTTP 200 OK (see arrow 814).

After acquiring the status information from web application 610, conversion system 620 provides the status information to IMS network 630 and/or UE 640 as follows. The POST operation from web application 610 (see arrow 813) included a delivery status report for the MO SMS message. Thus, conversion system 620 converts the POST operation to a SIP MESSAGE that includes the status information. The status information at this point is for the original SIP MESSAGE that carried the MO SMS message. Conversion system 620 embeds the status information in the RP-ACK of the SIP MESSAGE, and transmits the SIP MESSAGE with the status information to UE 640 (see arrows 815-817). UE 640 replies back to conversion system 620 with a SIP 200 OK (see arrows 818-820).

Because UE 640 requested a delivery status report for the MO SMS message, web application 610 also determines whether the MO SMS message was successfully delivered to the user. If so, web application 610 generates status information (i.e., delivery receipt) for the MO SMS message, and inserts the status information in a POST operation (NotifySmsDeliveryReceipt). One example of the POST operation is as follows:

```
POST /openapi/sms/rest/v1.0/deliveryreceiptnotification HTTP/1.1
X-Partner-Id: ACP123@acp.alcatel-lucent.com
X-Service-Id: APP123@ACP123
Host: acp.alcatle-lucent.com
Content-Type: application/json
Content-Length: (...)
{"requestedID":"123456789","deliveryInformation":{"address": "tel:
+16302441234","deliveryStatus":"deliveredToNetwork"}}
```

Web application 610 then transmits the POST operation (NotifySmsDeliveryReceipt) to conversion system 620 (see arrow 821). Conversion system 620 replies back to web application 610 with an HTTP 200 OK (see arrow 822).

Conversion system 620 converts the POST operation (NotifySmsDeliveryReceipt) request to a SIP MESSAGE that includes the status information for the MO SMS message. The status information is embedded in the RP-DATA/Status of the SIP MESSAGE, such as in the MAP Report-SM-Delivery-Status (SMS-STATUS-REPORT). Conversion system 620 then transmits the SIP MESSAGE to UE 640 through IP-SM-GW 632 and S-CSCF 634 (see arrows 823-825). UE 640 replies back to conversion system 620 with a SIP 200 OK (see arrows 826-828). There may be additional messaging that is used to deliver the MO SMS message and its associated status information, as FIG. 8 gives an overview of the messaging used in the SMS delivery.

Figure 9:
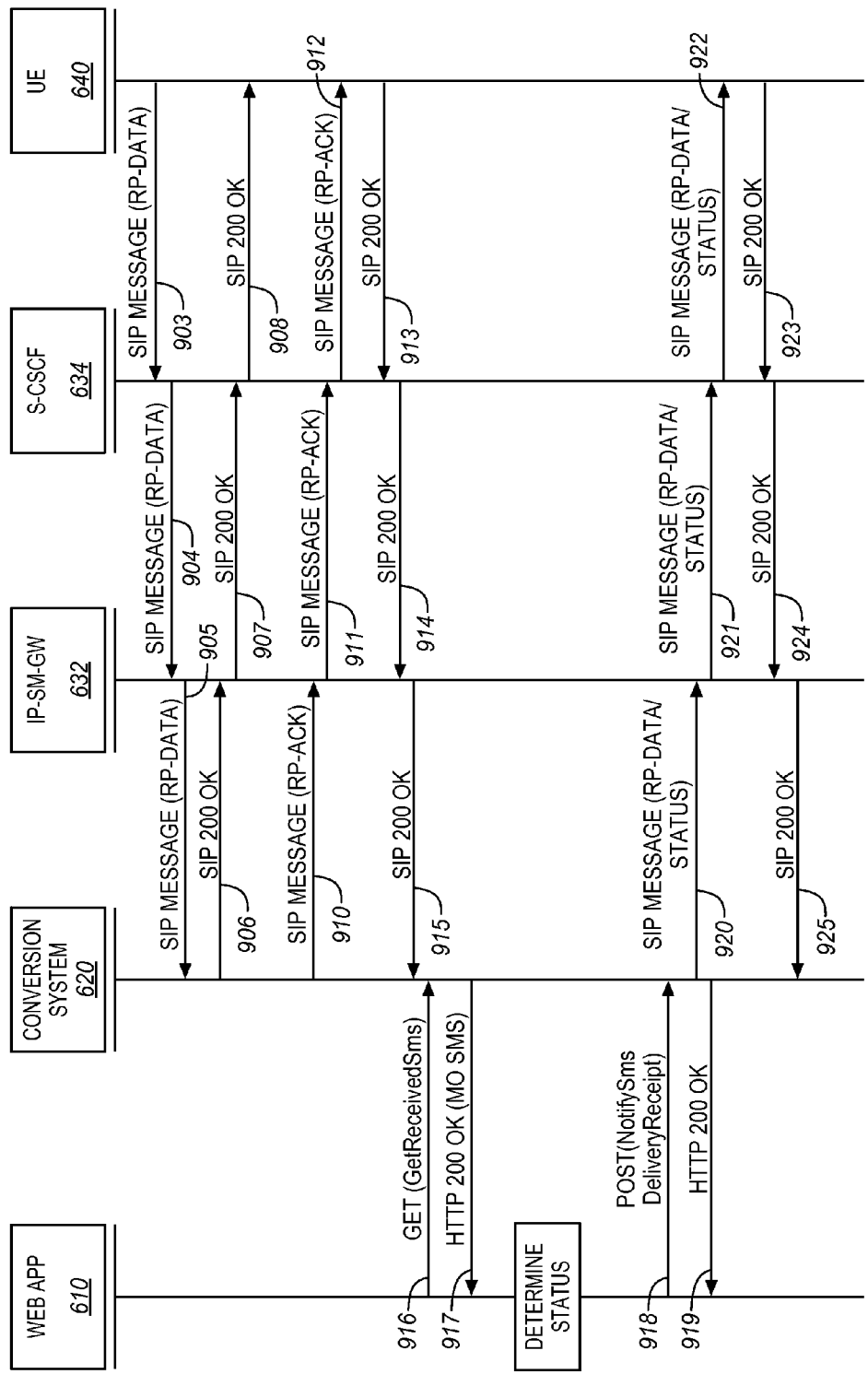
FIG. 9 is a message diagram illustrating another call flow for a MO SMS message in an exemplary embodiment.

FIG. 9 is a message diagram illustrating another call flow for a MO SMS message in an exemplary embodiment. FIG. 9 illustrates the scenario where the user of web application 610 is offline when the MO SMS message is sent. The call flow in FIG. 9 is similar to FIG. 8 where UE 640 sends a SIP MESSAGE to conversion system 620 that encapsulates an MO SMS message (see arrows 903-905). Because the user of web application 610 is offline at the time, conversion system 620 stores the MO SMS message. Conversion system 620 transmits a SIP MESSAGE that includes status information to UE 640 through IP-SM-GW 632 and S-CSCF 634 (see arrows 910-912). The status information at this point is for the original SIP MESSAGE that carried the MO SMS message, and is embedded in the RP-ACK of the SIP MESSAGE. UE 640 replies back to conversion system 620 with a SIP 200 OK (see arrows 913-915).

When the user logs into web application 610, web application 610 generates a GET (GetReceivedSms) operation to retrieve MO SMS messages that are stored for the user (if any). One example of the GET operation (GetReceivedSms) is as follows:

```
GET /openapi/sms/rest/v1.0/registration/7777/messages HTTP/1.1
Authorization: Basic XMVDTdx+
X-Partner-Id: ACP123@acp.alcatel-lucent.com
X-Service-Id: APP123@ACP123
Host: acp.alcatel-lucent.com
Accept application/json
Content-Length: 0
```

Web application 610 then transmits the GET operation to conversion system 620 (see arrow 916). Conversion system 620 identifies the MO SMS message stored for the user, and converts the stored MO SMS message into a RESTful receive operation for web application 610. In this example, the RESTful receive operation is an HTTP 200 OK that encapsulates the MO SMS message. One example of the HTTP 200 OK is as follows:

```
HTTP/1.1 200 OK
Content-Type: application/json
Content-Length: (...)
{"receivedSMS":[{"sendAddress":"tel:+16303556789",
"smsServiceActivation Number":"7777","message body":"Hello,
Bob","DateTime":" 2010-12-25T18:30:30"}]}
```

Conversion system 620 then transmits the HTTP 200 OK to web application 610 (see arrow 917). The call flow in FIG. 9 then continues as in FIG. 8 to provide status information for the MO text message to UE 640 (see arrows 918-925).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:

a conversion system implemented between a web application and a packet-switched network, the conversion system comprising:

an interface configured to receive a RESTful send operation for sending a Mobile Terminated (MT) text message from the web application to a recipient; and a controller configured to convert the RESTful send operation for the MT text message to a first Session Initiation Protocol (SIP) request that encapsulates MAP-Relay Protocol (RP) data, to extract address data and an SMS body for the MT text message from the RESTful send operation, to map the address data to a MAP RP-Originating-Address field and a MAP RP-Destination-Address field of the first SIP request, and to map the SMS body for the MT text message to a MAP TP-User Data field of a Transfer Protocol Data Unit (TPDU) contained in a MAP RP-User-Data field of the first SIP request;

the interface is configured to transmit the first SIP request for the MT text message to the packet-switched network for delivery of the MT text message to the recipient;

the interface is configured to receive a second SIP request from the packet-switched network indicating a delivery status for the MT text message, wherein the second SIP request encapsulates the MAP-RP data;

the controller is configured to convert the second SIP request to a RESTful status operation, to parse the MAP TP-User Data field of the TPDU contained in the MAP RP-User-Data field of the second SIP request to identify a delivery status of the MT text message to the recipient, and to encapsulate the delivery status of the MT text message in the RESTful status operation; and the interface is configured to transmit the RESTful status operation to the web application.

2. The system of claim 1 wherein:
the first SIP request comprises a SIP MESSAGE.

3. The system of claim 1 wherein:
the RESTful send operation comprises an HTTP POST.

4. The system of claim 1 wherein the MT text message comprises a Short Messaging Service (SMS) message.

5. The system of claim 1 wherein the MT text message comprises a Multimedia Messaging Service (MMS) message.

6. The system of claim 1 wherein:

the interface is configured to receive a third SIP request for a Mobile Originated (MO) text message from the packet-switched network, wherein the third SIP request encapsulates the MO text message in the MAP-RP data;

the controller is configured to convert the third SIP request to a RESTful receive operation, to extract an SMS body for the MO text message from the MAP TP-User Data field of the TPDU contained in the MAP RP-User-Data field of the third SIP request, and to encapsulate the SMS body for the MO text message in the RESTful receive operation; and the interface is configured to transmit the RESTful receive operation for the MO text message to the web application for delivery of the MO text message to a user of the web application.

7. The system of claim 6 wherein:

the interface is configured to receive a RESTful status operation from the web application indicating a delivery status for the MO text message to the user of the web application;

the controller is configured to convert the RESTful status operation to a fourth SIP request that encapsulates the MAP-RP data, and to map the delivery status from the RESTful status operation to the MAP TP-User Data field of the TPDU contained in the MAP RP-User-Data field of the fourth SIP request; and the interface is configured to transmit the fourth SIP request to the packet-switched network.

8. A method comprising:

receiving a RESTful send operation for sending a Mobile Terminated (MT) text message from a web application to a recipient;

converting the RESTful send operation for the MT text message to a first Session Initiation Protocol (SIP) request that encapsulates MAP-Relay Protocol (RP) data;

extracting address data and an SMS body for the MT text message from the RESTful send operation;

mapping the address data to a MAP RP-Originating-Address field and a MAP RP-Destination-Address field of the first SIP request;

mapping the SMS body for the MT text message to a MAP TP-User Data field of a Transfer Protocol Data Unit (TPDU) contained in a MAP RP-User-Data field of the first SIP request;

transmitting the first SIP request for the MT text message to the packet-switched network for delivery of the MT text message to the recipient;

receiving a second SIP request from the packet-switched network indicating a delivery status for the MT text message, wherein the second SIP request encapsulates the MAP-RP data;

converting the second SIP request to a RESTful status operation;

parsing the MAP TP-User Data field of the TPDU contained in the MAP RP-User-Data field of the second SIP request to identify a delivery status of the MT text message to the recipient;

encapsulating the delivery status of the MT text message in the RESTful status operation; and transmitting the RESTful status operation to the web application.

9. The method of claim 8 wherein:
the first SIP request comprises a SIP MESSAGE.

10. The method of claim 8 wherein:
the RESTful send operation comprises an HTTP POST.

11. The method of claim 8 wherein the MT text message comprises a Short Messaging Service (SMS) message.

12. The method of claim 8 wherein the MT text message comprises a Multimedia Messaging Service (MMS) message.

13. The method of claim 8 further comprising:

receiving a third SIP request for a Mobile Originated (MO) text message from the packet-switched network, wherein the third SIP request encapsulates the MO text message in the MAP-RP data;

converting the third SIP request to a RESTful receive operation;

extracting an SMS body for the MO text message from the MAP TP-User Data field of the TPDU contained in the MAP RP-User-Data field of the third SIP request;

encapsulating the SMS body for the MO text message in the RESTful receive operation; and transmitting the RESTful receive operation for the MO text message to the web application for delivery of the MO text message to a user of the web application.

14. The method of claim 13 further comprising:

receiving a RESTful status operation from the web application indicating a delivery status for the MO text message to the user of the web application;

converting the RESTful status operation to a fourth SIP request that encapsulates the MAP-RP data;

mapping the delivery status from the RESTful status operation to the MAP TP-User Data field of the TPDU contained in the MAP RP-User-Data field of the fourth SIP request; and transmitting the fourth SIP request to the packet-switched network.

15. A system comprising:

an Application Programming Interface (API) for a web application used in text messaging;

the API including a processor configured to receive a RESTful send operation for sending a Mobile Terminated (MT) text message from the web application to User Equipment (UE), to convert the RESTful send operation for the MT text message to a first Session Initiation Protocol (SIP) request that encapsulates MAP-Relay Protocol (RP) data, to extract address data and an SMS body for the MT text message from the RESTful send operation, to map the address data to a MAP RP-Originating-Address field and a MAP RP-Destination-Address field of the first SIP request, to map the SMS body for the MT text message to a MAP TP-User Data field of a Transfer Protocol Data Unit (TPDU) contained in a MAP RP-User-Data field of the first SIP request, and to transmit the first SIP request for the MT text message to the packet-switched network for delivery of the MT text message to the UE;

the processor of the API is configured to receive a second SIP request from the packet-switched network indicating a delivery status for the MT text message, wherein the second SIP request encapsulates the MAP-RP data;

the processor of the API is configured to convert the second SIP request to a RESTful status operation, to parse the MAP TP-User Data field of the TPDU contained in the MAP RP-User-Data field of the second SIP request to identify a delivery status of the MT text message to the UE, to encapsulate the delivery status of the MT text message in the RESTful status operation, and to transmit the RESTful status operation to the web application.

16. The system of claim 15 wherein:

the processor of the API is configured to receive a third SIP request for a Mobile Originated (MO) text message from the packet-switched network, wherein the third SIP request encapsulates the MO text message in the MAP-RP data;

the processor of the API is configured to convert the third SIP request to a RESTful receive operation, to extract an SMS body for the MO text message from the MAP TP-User Data field of the TPDU contained in the MAP RP-User-Data field of the third SIP request, to encapsulate the SMS body for the MO text message in the RESTful receive operation, and to transmit the RESTful receive operation for the MO text message to the web application for delivery of the MO text message to a user of the web application.

* * * * *